(No Model.)

F. W. JENKINS.
SAFETY APPLIANCE FOR STREET RAILWAY CARS.

No. 521,981. Patented June 26, 1894.

WITNESSES:
Chy Kable,
Charles Schroeder

INVENTOR
F. W. Jenkins
BY
ATTORNEYS.

UNITED STATES PATENT OFFICE.

FRANK W. JENKINS, OF BROOKLYN, NEW YORK.

SAFETY APPLIANCE FOR STREET-RAILWAY CARS.

SPECIFICATION forming part of Letters Patent No. 521,981, dated June 26, 1894.

Application filed August 4, 1893. Serial No. 482,334. (No model.)

*To all whom it may concern:*

Be it known that I, FRANK W. JENKINS, a citizen of the United States, residing in the city of Brooklyn, in the county of Kings and State of New York, have invented certain new and useful Improvements in Safety Appliances for Street-Railway Cars, of which the following is a specification.

The object of my invention is to provide a new and improved appliance of simple construction, and which is light, strong and durable, for the ends of cable, trolley or other cars, for the purpose of throwing aside obstructions that may rest on the tracks, and preventing persons from being killed or injured by falling in front of a passing car.

The invention consists in the construction and combination of various parts and details, which will be fully described hereinafter and be finally pointed out in the claims.

Figure 1:
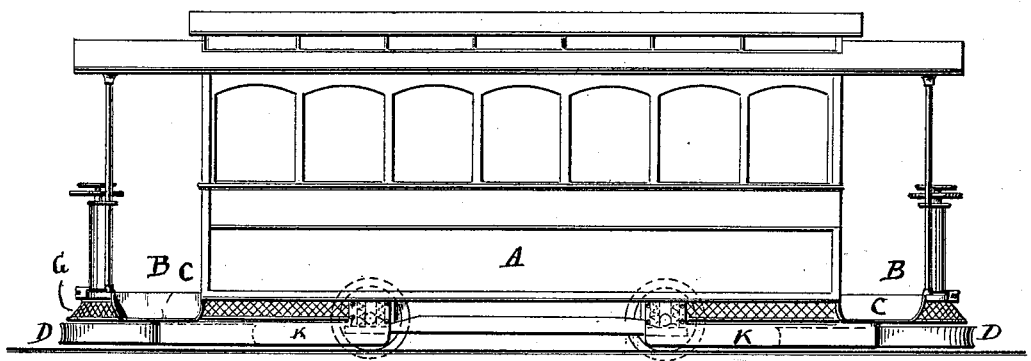
Figure 2:
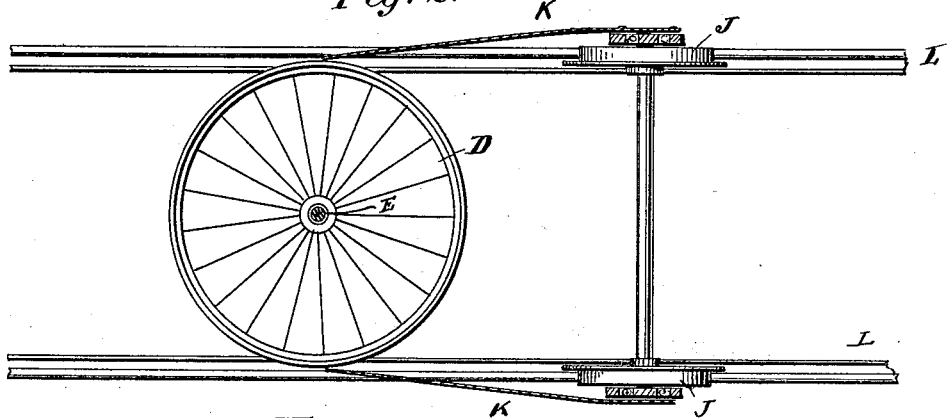
Figure 3:
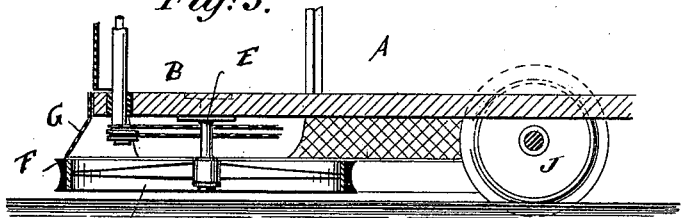

In the accompanying drawings, Figure 1 is a side view of the car, provided with my improved safety appliance. Fig. 2 is a plan view of the safety appliance, the car body being omitted, and Fig. 3 is a vertical longitudinal sectional view through one end part of the car, showing the safety appliance.

Similar letters of reference indicate corresponding parts.

The car A is provided at each end with the usual platform B and step C of any approved construction. Below each platform, a wheel D is mounted horizontally on a vertical pivot E projecting downward from the car floor, the diameter of which wheel is about equal to the gage of the tracks. The rim of the wheel is from four to six inches more or less in height, and is provided with a tire F of soft rubber, leather or other yielding material. The wheel is mounted with ball-bearings so as to rotate very freely, and under the lightest pressure. The rim of the wheel projects beyond the edge of the platform B, as shown in Figs. 1 and 3, and a wire netting or other suitable guard or fender G extends from the edge of the platform to the top of the rim of the wheel, said guard or fender having a greater or less inclination. From the sides of wheels J, guard-plates K extend tangentially to the wheel D at diametrically opposite sides of said wheel, the front ends of these guard-plates being about centrally above the rails L. Said guard-plates K can be attached to the wheel standards, or supported directly from the car body. The nicely balanced wheel D is not driven from any parts of the car, but remains practically motionless, until it strikes an obstruction. Accordingly as the wheel strikes this obstruction at the right or left of the longitudinal central lines of the car, the wheel D is turned to the right or left, and in so doing pushes the said object to the right or left and off the track, for the reason that the car moves forward, and under the action of the forward movement of the car and the resistance offered by the object, the wheel is turned. The guard-plates K prevent the object that has been pushed from the track by the wheel D, from accidentally passing under the wheels J, that is in between the horizontal wheel D and the car wheels.

The above mentioned wheel D is arranged as close as possible to the tracks so as to prevent its riding over objects when the car rocks or jolts. If a person falls or is pushed upon the tracks, he must come in contact with the wheel D of the moving car before another part of the car can strike him, and as this wheel is loosely mounted it turns the body to one side and off the track.

This safety appliance can easily be applied on all cable or trolley cars, and all cars having their own motors, such as storage battery cars, compressed air cars, carbonic acid motor cars, &c.

Having thus described my invention, I claim as new and desire to secure by Letters Patent—

1. The combination with a car having the platform rounded, of a wheel mounted loosely and in horizontal position below the platform, the wheel having a diameter equal to the gage of a track on which the car runs, the front parts of the wheel circumference projecting slightly beyond the rounded edge of the car platform and an inclined guard extending from the car platform to the wheel, substantially as set forth.

2. The combination with a car platform having its end rounded and a wheel mounted loosely and in horizontal position below the platform, the diameter of which wheel is equal to the gage of the tracks on which the car runs, and guard plates extending from diametrically opposite points of said loose wheel to the car wheels, substantially as set forth.

In testimony that I claim the foregoing as my invention I have signed my name in presence of two subscribing witnesses.

FRANK W. JENKINS.

Witnesses:
 OSCAR F. GUNZ,
 CHARLES SCHROEDER.